(12) United States Patent
Refai et al.

(10) Patent No.: US 6,992,997 B1
(45) Date of Patent: Jan. 31, 2006

(54) METHODS, WIRELESS TERMINALS, AND SYSTEMS FOR ACQUIRING SERVICE USING STORED TDMA DIGITAL CONTROL CHANNEL INFORMATION

(75) Inventors: Wail Refai, Apex, NC (US); David Hoover, Cary, NC (US); Keith W. Anderson, Durham, NC (US)

(73) Assignee: Telefonaktiebolaget L.M. Ericsson, Stockholm (SE)

( * ) Notice: Subject to any disclaimer, the term of this patent is extended or adjusted under 35 U.S.C. 154(b) by 822 days.

(21) Appl. No.: 09/690,201

(22) Filed: Oct. 17, 2000

(51) Int. Cl.
*H04Q 7/00* (2006.01)

(52) U.S. Cl. ........................ 370/329; 455/434

(58) Field of Classification Search ............. 370/278, 370/282, 313, 329, 317, 336, 337, 347, 348, 370/349, 350, 433, 437, 442, 443, 465, 252, 370/332, 333, 342, 441; 455/434, 466, 456.3; 379/88.13; 340/425.5
See application file for complete search history.

(56) References Cited

U.S. PATENT DOCUMENTS

| | | | |
|---|---|---|---|
| 5,048,059 A | 9/1991 | Dent | 375/94 |
| 5,768,267 A * | 6/1998 | Raith et al. | 370/329 |
| 5,950,130 A | 9/1999 | Coursey | 455/432 |
| 5,953,665 A * | 9/1999 | Mattila | 455/434 |
| 6,400,948 B1 * | 6/2002 | Hardin | 455/434 |
| 6,400,956 B1 * | 6/2002 | Richton | 455/456.3 |
| 6,414,945 B1 * | 7/2002 | Chennakeshu et al. | 370/317 |
| 6,529,586 B1 * | 3/2003 | Elvins et al. | 379/88.13 |
| 6,545,596 B1 * | 4/2003 | Moon | 340/425.5 |

FOREIGN PATENT DOCUMENTS

| | | |
|---|---|---|
| DE | 4106784 A1 | 9/1992 |
| EP | 0817403 A2 | 1/1998 |
| WO | WO 99/43136 | 8/1999 |
| WO | WO 00/39982 | 7/2000 |

OTHER PUBLICATIONS

International Search Report, PCT US01/31933; May 2, 2002.
*Digital Control Channel Layer 3*, TIA/EIA-136-A, Part 123, Sections 4.1-4.3, Aug. 31, 1999.
Patent Application Entitled *Methods and Systems for Scanning and Locking Onto A Control Channel Via a Multi-Level Search in a Wireless Communications System*; Anderson et al., Filed Sep. 7, 2000.

* cited by examiner

*Primary Examiner*—Bob Phunkulh
*Assistant Examiner*—Robert W. Wilson
(74) *Attorney, Agent, or Firm*—Myers Bigel Sibley & Sajovec, PA

(57) ABSTRACT

Methods for acquiring service for a wireless terminal can include the steps of camping on a control channel and receiving a request for an operation to be performed by the wireless terminal that is performed by the wireless terminal mutually exclusive of camping on the control channel. Control channel information associated with the control channel on which the wireless terminal was camped is stored and the requested operation is performed. The stored control channel information is used to acquire service for the wireless terminal. Related wireless terminals and systems are disclosed.

35 Claims, 8 Drawing Sheets

METHODS, WIRELESS TERMINALS, AND SYSTEMS FOR ACQUIRING SERVICE USING STORED TDMA DIGITAL CONTROL CHANNEL INFORMATION

BACKGROUND OF THE INVENTION

The present invention relates to the field of communications in general, and more particularly, to wireless communications.

In radiotelephone and other wireless communication systems, wireless terminals often acquire service by "locking onto" or "camping" on a Digital Control Channel (DCCH) after powering up and/or when transitioning between base stations to provide, for example, synchronization or handshaking with the wireless communications system. In some situations, such as power-up, the wireless terminal may not know which control channel to camp on. Thus, the wireless terminal may have to locate such a control channel. This may be accomplished by "scanning" channels in the wireless communications system to locate a control channel which is considered acceptable. The process of scanning channels to locate such a control channel is sometimes referred to as an Intelligent Roaming ("IR") search or as a Power-Up Scan.

In some wireless communications systems, the IR search is performed as a series of separate scans of selected operating frequencies. For instance, the system standard for TIA/EIA-136 wireless communications systems specifies an IR search that may include as many as four separate stages. In the first stage of the IR search, the wireless terminal scans a set of Private Operating Frequencies ("POF"). These private operating frequencies are the frequencies on which certain private or residential systems operate (at least in some geographic areas) to which the wireless terminal is allowed access. If a DCCH that is part of such a private or residential system having an acceptable received signal strength is identified in the POF scan, then the wireless terminal may camp on the DCCH.

If a private or residential system DCCH is not found during the POF scan, the wireless terminal may proceed to the second stage of the IR search. In this stage, control channels maintained in memory by the wireless terminal in a Digital control channel History Table (DHT) are scanned. The DHT contains a non-redundant listing of the frequency band and DCCH channel number of the control channels (excluding control channels on POF's) on which the wireless terminal has most recently camped. The DHT can contain multiple entries for a particular frequency band. The DHT is provided in TIA/EIA-136 compatible wireless terminals to speed-up the search for a control channel during an IR search, as, in many cases, an acceptable control channel corresponding to a highest priority service provider will be listed in the DHT. Under TIA/EIA-136, a control channel identified during the DHT scan is only considered acceptable for camping if it has at least the minimum received signal strength and if it is in a frequency band operated by either a Home or a Partner service provider.

If an acceptable control channel is not identified during the DHT scan, the IR search may continue to a third stage, which is referred to as the wideband scan. The wideband scan is typically the most involved of the channel scans. During the wideband scan, each of the frequency bands specified in the Intelligent Roaming Database (IRDB) is scanned, and the wireless terminal once again seeks to identify a DCCH that is on a frequency band operated by a Home or Partner service provider that has a minimum receive signal strength level. In lieu of scanning all of the hundreds of channels that are part of each frequency band, during the wideband scan each frequency band is typically divided into a number of "sub-bands" or "probability blocks", and the channels having the highest received signal strength in each sub-band/probability block are selected for scanning.

During the wideband scan, the wireless terminal will examine the first control channel identified in each frequency band to determine if the frequency band is operated by a Home, Partner, Favored, Neutral or Forbidden service provider. If the frequency band is operated by a Favored, Neutral or Forbidden service provider, the scan of the band is typically aborted at that point, and if the frequency band is operated by a Favored or Neutral service provider, the frequency band, along with the highest received signal strength channels from each sub-band or probability block may be added to a "Re-Scan List" that identifies the frequency band channel pairs that are scanned during a fourth and final stage of the IR search.

If an acceptable control channel is not identified during the wideband scan, the IR search may proceed to the fourth or re-scan stage. During this stage, the wireless terminal scans each of the frequency band-channel pairs included in the Re-Scan List. During the fourth stage of the IR search, if the wireless terminal identifies a DCCH having at least the minimum received signal strength that is operated by a Favored or Neutral service provider, the wireless terminal attempts to camp on that DCCH.

The time needed to locate an acceptable control channel using the IR search described above may be considerable. For example, a scan of all bands may take about 5 minutes. Unfortunately, during the time when the wireless terminal is performing the IR search the wireless terminal may not be able to receive pages from the wireless communications system, possibly resulting in lost calls.

Some types of wireless terminals, such as those which use Code Division Multiple Access (CDMA) and Global System for Mobile Communications (GSM) type communications, may be capable of performing other operations while simultaneously performing the scanning operation described above. For example, CDMA and GSM compliant wireless terminals may be capable of performing Voice-Activated Dialing (VAD) operations while simultaneously camping on or scanning for a control channel. Other types of wireless terminals, such as those that use Time Division Multiple Access (TDMA) type communications, may not be capable of scanning or camping while simultaneously performing other operations. For example, TDMA wireless terminals may not be capable of performing VAD operations while simultaneously camping on a control channel.

SUMMARY OF THE INVENTION

Embodiments according to the present invention can provide methods for acquiring service for a TDMA wireless terminal and associated wireless terminals. Pursuant to these embodiments, a wireless terminal that is camping on a TDMA digital control channel may receive a request to perform an operation that the wireless terminal performs mutually exclusive of camping on the TDMA digital control channel. After reviewing such a request, TDMA digital control channel information associated with the TDMA digital control channel may be stored and the requested operation may be performed. The stored TDMA digital control channel information may then be used to re-acquire service for the wireless terminal.

Using the stored TDMA DCCH information to acquire service for the wireless terminal may reduce the time that otherwise may be required to locate an acceptable TDMA digital control channel. In particular, the wireless terminal can first attempt to acquire service over the TDMA DCCH on which the wireless terminal was camped before the request to perform the operation was received. Accordingly, a lengthy conventional IR search may be avoided which may reduce the time that the wireless terminal is unable to receive pages and/or originate calls.

DETAILED DESCRIPTION OF THE INVENTION

Figure 1:
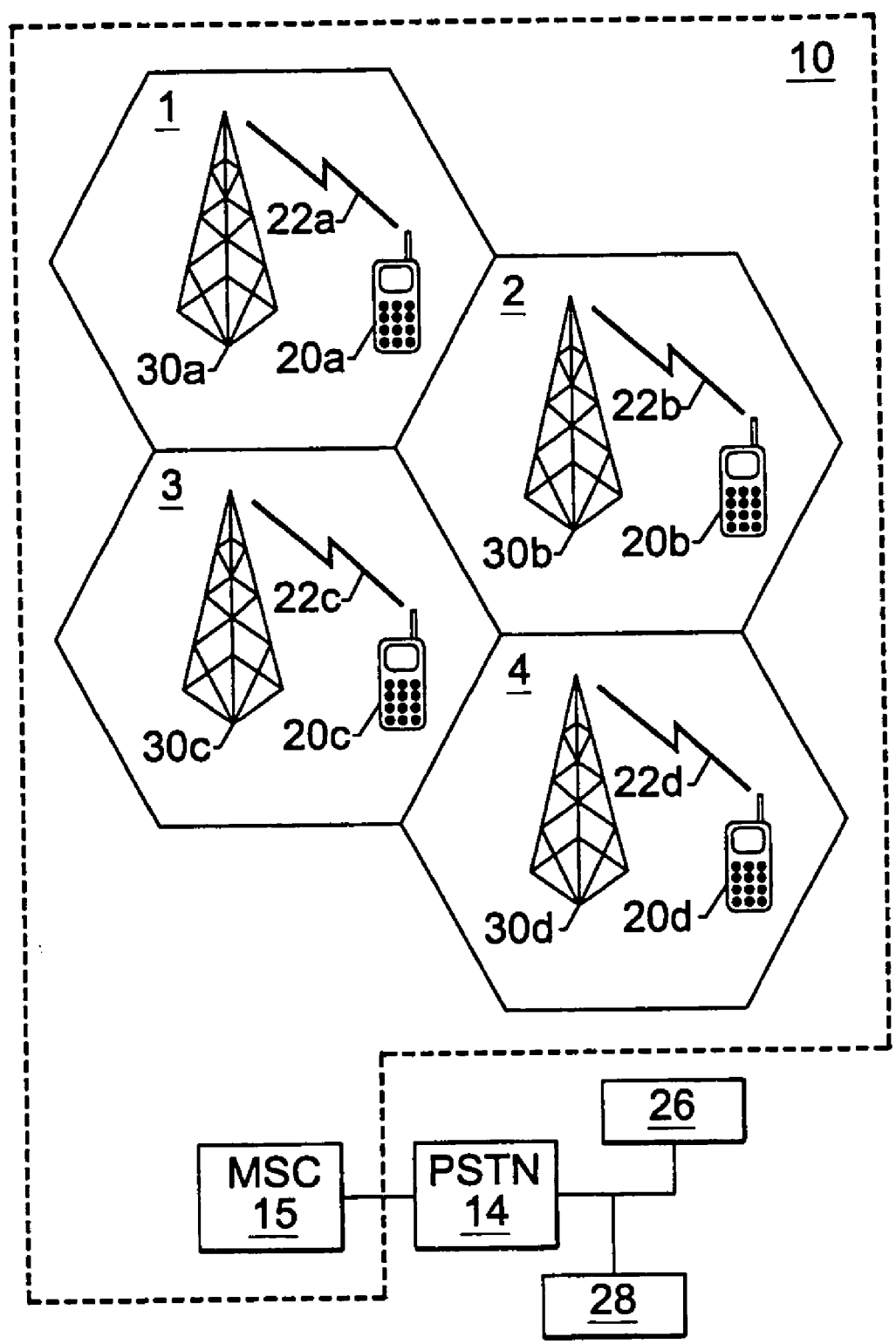
FIG. 1 is a diagram that illustrates embodiments of wireless communications systems according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as methods, wireless terminals and/or systems. Accordingly, the present invention may take the form of hardware embodiments, software embodiments or embodiments that combine software and hardware aspects.

The present invention is disclosed using flowchart illustrations and block diagrams. It will be understood that each block (of the flowchart illustrations and block diagrams), and combinations of blocks, can be implemented by computer program instructions. These program instructions may be provided to a processor circuit(s) within the wireless terminal or system, such that the instructions which execute on the processor circuit(s) create means for implementing the functions specified in the block or blocks. The computer program instructions may be executed by the processor circuit(s) to cause a series of operational steps to be performed by the processor circuit(s) to produce a computer implemented process such that the instructions which execute on the processor circuit(s) provide steps for implementing the functions specified in the block or blocks.

Accordingly, the blocks support combinations of means for performing the specified functions, combinations of steps for performing the specified functions and program instructions for performing the specified functions. It will also be understood that each block, and combinations of blocks, can be implemented by special purpose hardware-based systems which perform the specified functions or steps, or combinations of special purpose hardware and computer instructions.

The present invention is generally described herein in the context of TDMA wireless terminals and terrestrial systems.

As used herein, the term "TDMA wireless terminal" may include, any wireless TDMA communications device, specifically including, among other things, a single or dual mode cellular radiotelephone with or without a multi-line display; a Personal Communications System (PCS) terminal that may combine a cellular radiotelephone with data processing, facsimile and data communications capabilities; a Personal Data Assistant ("PDA") that can include a radiotelephone, pager, Internet/intranet access, Web browser, organizer, calendar and/or a global positioning system (GPS) receiver; and a conventional laptop and/or palmtop receiver or other appliance all of which include a radiotelephone transceiver which uses Time Division Multiple Access (TDMA) type communications.

TDMA systems can be implemented by subdividing the frequency bands employed in conventional Frequency Division Multiple Access (FDMA) systems into sequential time slots. Although communication on frequency bands typically occur on a common TDMA frame that includes a plurality of time slots, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots (or burst periods) which define a frame. In these TDMA systems, each user can communicate with the base station using bursts of digital data transmitted during the user's assigned time slots. TDMA type communications are described further, for example, in *The Mobile Comminations Handbook*, Jerry D. Gibson, CRC Press, 1996.

According to the present invention, a TDMA wireless terminal that is camping on a TDMA DCCH can receive a request for an operation that the TDMA wireless terminal performs mutually exclusive of the camping on the TDMA digital control channel. Upon receiving such a request, the TDMA wireless terminal may store TDMA DCCH information that is associated with the TDMA DCCH on which the TDMA wireless terminal is camped, and then perform the requested operation. After performing the requested operation, the TDMA wireless terminal may use the stored TDMA DCCH information to re-acquire service for the wireless terminal.

As used herein, the term "mutually exclusive operation" includes operations which TDMA wireless terminals according to the present invention may not be able to perform at the same time. For example, for many TDMA wireless terminals camping is an operation that is mutually exclusive of playing an MP3 object. It will be understood that, as defined herein, operations may be mutually exclusive for a TDMA wireless terminal even though the terminal may be able to perform parts of the mutually exclusive operations at the same time. For example, some TDMA wireless terminal may be able to perform a setup portion of playing an MP3 object while camping on the TDMA DCCH. However, so long as the wireless terminal cannot complete both operations simultaneously, the operations are considered "mutually exclusive" as that term is used herein.

FIG. 1 is a diagram that illustrates a wireless communications system 10 that supports TDMA type communications in which wireless terminals according to the present invention can be used, such as a terrestrial cellular radiotelephone system. Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems, such as those conforming to the North American standard IS-54 and the European standard GSM, have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data).

According to FIG. 1, a plurality of wireless terminals 20a–d can communicate with each other and other terminals, such as terminals 26, 28, via the wireless communications system 10 and a Public Service Telephone Network (PSTN) 14. The wireless terminals 20a–d can be cellular telephones.

The wireless communications system 10 is organized as cells 1a–d that collectively can provide service to a geographic region. In particular, each of the cells 1a–d can provide service to associated sub-regions included in the geographic region covered by the wireless communications system 10. More or fewer cells can be included in the wireless communications system 10, and the coverage area for cells may overlap.

Each of the cells 1a–d may include an associated base station 30a–d. The base stations 30a–d can provide wireless communications between each other and the wireless terminals 20a–d in the associated geographic region to allow for communications between the wireless terminals 20a–d and/or the terminals 26, 28 in the PSTN 14.

Each of the base stations 30a–d can transmit/receive data to/from the wireless terminals 20a–d over an associated TDMA Digital Control Channel (DCCH) 22a–d (referred to herein as control channels 22a–d). For example, the base station 30a in cell 1a can communicate with the wireless terminal 20a over the control channel 22a. The control channel 22a can be used to page the wireless terminal 20a in response to calls directed thereto or to transmit traffic channel assignments to the wireless terminal 20a over which a call associated therewith is to be conducted. The control channels 22a–d can be identified using control channel numbers or identifiers. For example, the wireless terminal 20a can store a channel number that identifies control channel 20a as the control channel on which it is currently camping.

The control channels 22a–d can carry a neighbor list of control channels associated with "neighbor" cells. For example, control channel 22a can carry a neighbor list that includes the channel numbers of control channels 22b–d. Greater or fewer control channels can be included in the neighbor list. TDMA and digital control channels are well known in the art and hence will not be discussed further herein.

The control channels included in the neighbor list can appear in the order of the quality of the control channel at the wireless terminal. Each wireless terminal can transmit an indication of the quality of each control channel detected by the wireless terminal. The wireless communications system 10 can determine the relative quality of each neighboring control channel and transmit the neighbor list so that the neighboring control channels are transmitted, for example, in descending order of quality with the best quality being transmitted first. Other orders may be used.

In some embodiments, the acceptability control channel may be determined by comparing a signal strength measure, of the control channel such as a Radio Signal Strength (RSS) indication to a predetermined threshold. RSS is further discussed, for example, in commonly assigned U.S. Pat. No. 5,048,059 to Dent, entitled Log-polar Signal Processing, the entire disclosure of which is incorporated herein by reference.

The present invention may also be used in celestial communications systems such as satellite communications systems. The celestial wireless communication system may be employed to perform similar functions to those performed by the terrestrial wireless communication system of FIG. 1. In particular, the celestial wireless communication system typically includes one or more satellites that serve as relays or transponders between one or more earth stations and satellite wireless terminals. The satellites typically communicate with the satellite wireless terminals and earth stations via duplex communication links. Each earth station may, in turn, be connected to the PSTN 14 and the terrestrial wireless communications system 10, allowing communications between the satellite wireless terminals, terminals 28, 26, and wireless terminals 20a–d.

The celestial wireless communication system may utilize a single antenna beam covering the entire geographic region served by the system or the celestial wireless communication system may be designed such that it produces multiple overlapping or non-overlapping beams that serve different sub-regions of the entire geographic region served by the celestial wireless communications system. The satellites and the respective sub-regions may serve a function similar to that of the base stations 30a–d and the associated cells 1a–d of the terrestrially based wireless communication system. Thus, the celestial wireless communication system may perform similar functions to those performed by the terrestrial wireless communications system 10 of FIG. 1.

Figure 2:
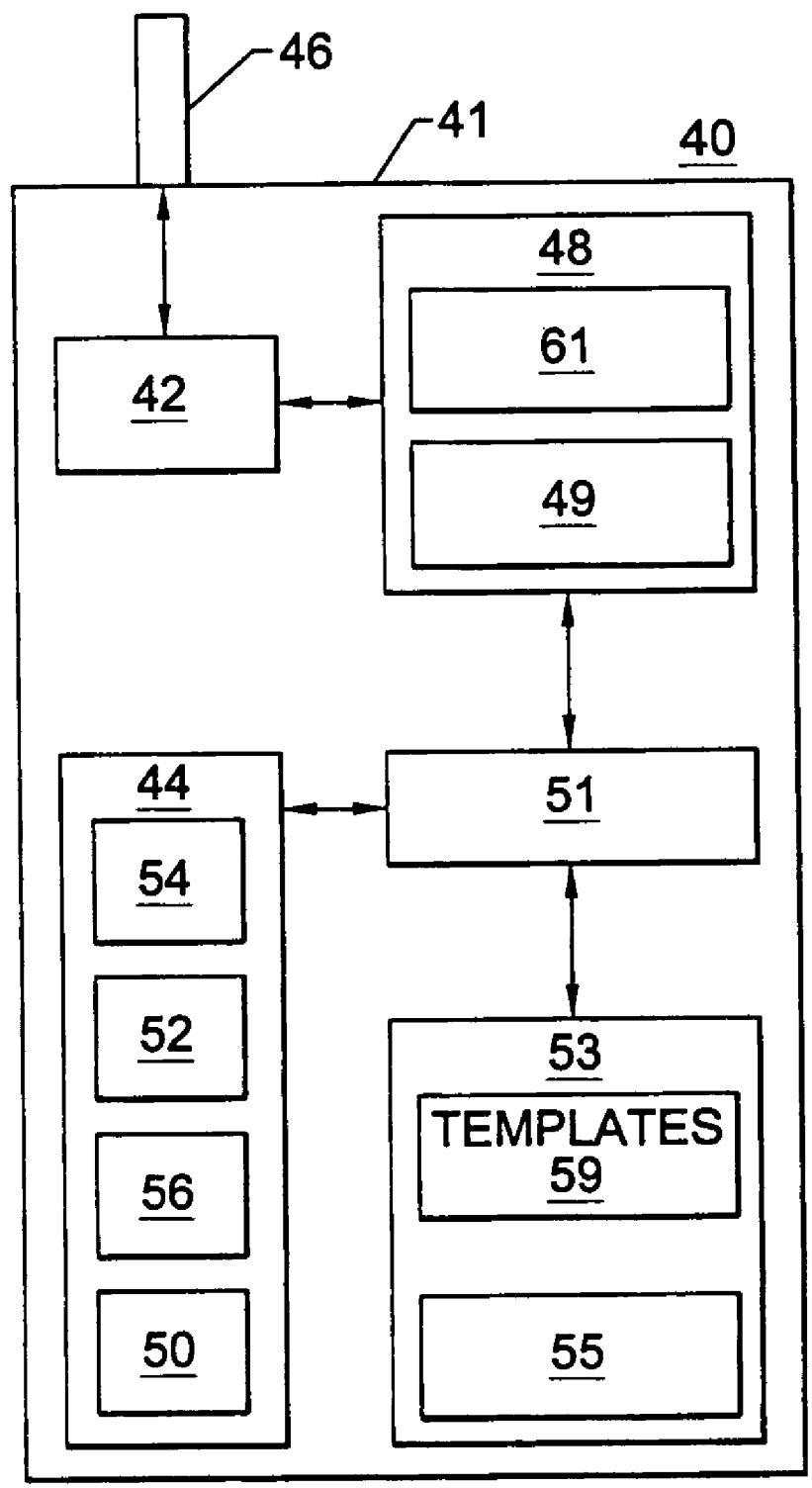
FIG. 2 is a block diagram that illustrates embodiments of wireless terminals according to the present invention.

FIG. 2 is a block diagram that illustrates exemplary TDMA wireless terminals 40 according to embodiments of the present invention. As illustrated in FIG. 2, the TDMA wireless terminal 40 (referred to herein as wireless terminal 40) may include a transmitter/receiver or "transceiver" circuit 42 that is operative to transmit and receive TDMA type radio frequency communication signals via an antenna system 46 under control of a controller circuit 48. The antenna system 46 may include an antenna feed structure and one or more antennas.

As is well known to those of skill in the art, the transmitter portion of the transceiver 42 converts the information which is to be transmitted by the wireless terminal 40 into electromagnetic signals suitable for radio communications. The receiver portion of the transceiver 42 demodulates electromagnetic signals which are received by the wireless terminal 40 to provide the information contained in the signals in a format which is understandable to the user.

The transceiver 42, the controller circuit 48 and other components of the wireless terminal 40 may be implemented using a variety of hardware and software. For example, operations of the transceiver 42 and/or the controller 48 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP).

A user interface 44 of the wireless terminal may include a variety of components, such as a display 54, a keypad 52, a speaker 56, and a microphone 50, operations of which are known to those of skill in the art and will not be further discussed herein. It will be understood that the functions of keypad 52 and the display 54 can be provided by a touch screen through which the user can view information, such as computer displayable documents, provide input thereto, and otherwise control the wireless terminal 40. It will be understood by those having skill in the art that computer displayable documents (or Web pages) can be, for example, hypertext documents which can include text, images, input fields, output fields, and a variety of other objects.

A processor circuit 51 provides for overall operation of the wireless terminal 40 including coordination of communications, the user interface 44, and other components and systems included in the wireless terminal 40. For example, the processor circuit 51 can provide communications signals to the transceiver 42 when the user speaks into the microphone 50 and receives communications signals from the transceiver 42 for the reproduction of audio through the speaker 56. The processor circuit 51 can generate characters for display on the display 54. For example, the processor circuit 51 can generate numbers for display when the user enters a telephone number on the keypad 52. The characters can also be generated by a character generator circuit which is not shown.

The controller circuit 48 may include a Digital Signal Processor (DSP) circuit 49 that provides digital signal processing operations such as scanning for an acceptable control channel, camping on a control channel (including maintaining synchronization with the base station that communicates with the wireless terminal 40), Voice Activated Dialing (VAD) services, performing media operations and the like. The media operations performed by the wireless terminal 40 can include executing MP3 and/or MPEG objects such as a single file or a collection of files. For example, the DSP circuit 49 can play audio by decompressing and playing an MP3 formatted object through the speaker 56 or by decompressing and displaying an MPEG formatted image on the display 54.

VAD operations can include a training mode, where the user speaks into the microphone 50 to enable the DSP circuit 49 to create voice templates 49. The voice templates 59 can represent, for example, digitized versions of the words spoken by the user. Each of the voice templates 59 can be associated with a telephone number. In some embodiments, multiple sets of voice templates 59 can be created so that multiple users of the wireless terminal 40 may use VAD services. After training, the voice templates 59 and the associated telephone numbers may be stored in a memory 53.

The voice templates 59 can be provided to (or loaded into) the DSP circuit 49 upon enabling of VAD operations. The DSP circuit 49 attempts to match audio input to the microphone 50 to one of the voice templates 59 using signal processing operations that are well know to those having skill in the art. If the DSP circuit 49 determines that the audio input matches one of the voice templates 59, the telephone number associated with the matching voice template 59 can be provided to the processor circuit 51 so that the VAD call can be originated. In some embodiments, the voice templates 59 are provided to the DSP circuit 49 upon power-up of the wireless terminal 40 or upon input to the microphone 50.

A memory 53 also may store, among other things, a variety of lists and databases 55 that can be used to scan for and locate an acceptable control channel for the wireless terminal 40. These lists and databases may include a DCCH History Table (DHT) and an Intelligent Roaming Database (IRDB). These and other tables can be used to perform an IR search such as those disclosed, for example, in commonly assigned U.S. patent application Ser. No. 09/656,673, by Anderson et al. (Anderson), filed Sep. 7, 2000, entitled Methods and Systems for Scanning and Locking Onto A Control Channel Via a Multi-Level Search in a Wireless Communications System, the entire disclosure of which is incorporated herein by reference.

The controller circuit 48 can also include a register 61 to store a control channel number. For example, the register 61 can store information regarding the control channel on which the wireless terminal 40 is currently camping. Alternatively, the control channel number can be stored in the memory 53.

It will be understood that the functionality of the controller circuit 48 and the processor circuit 51 can be interchanged or combined. Furthermore, the functionality of the controller circuit 48 and the transceiver circuit 42 can be interchanged or combined. All of the components described above in reference to FIG. 2 can be positioned in a housing 41.

Operations that are performed by the wireless terminal 40 using the DSP circuit 49 may be mutually exclusive of one another. In particular, the DSP circuit 49 may not include sufficient resources to perform both operation concurrently. For example, scanning and camping operations performed by the DSP circuit 49 may be mutually exclusive of other operations performed using the DSP circuit 49 such as: performing VAD operations, performing media operations (such as decompressing and playing MP3 objects, decompressing and displaying MPEG objects etc.), scanning for a different type of service such as CDMA, GSM, Enhanced Data rate Global Evolution (EDGE), Cellular Digital Packet Data (CDPD) services (in the case of a multi-mode wireless terminal 40, and the like.

Mutually exclusive operations can also include operations wherein RF portions of the wireless terminal 40, for example, when the wireless terminal 40 is brought into an environment that is sensitive to RF energy (such as a hospital). Other operations performed by the wireless terminal 40 may be mutually exclusive of scanning and camping operations.

Figure 3:
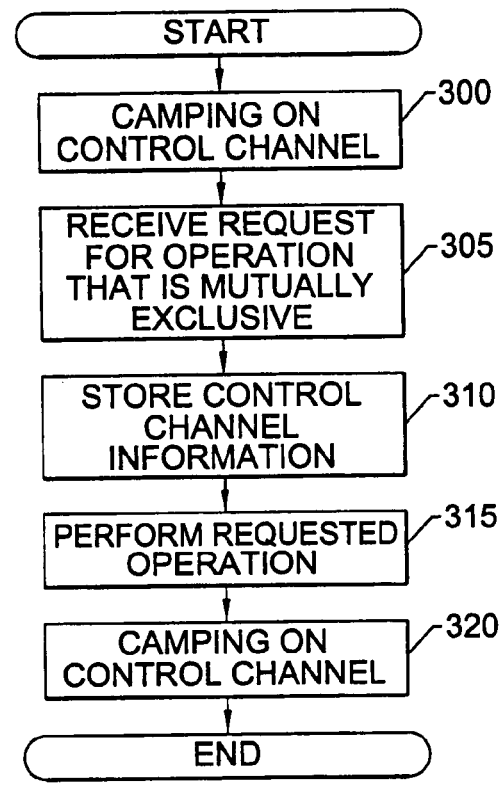
FIGS. 3–6 are flowcharts that illustrate operations of methods, wireless terminals and systems according the present invention.
Figure 4A:
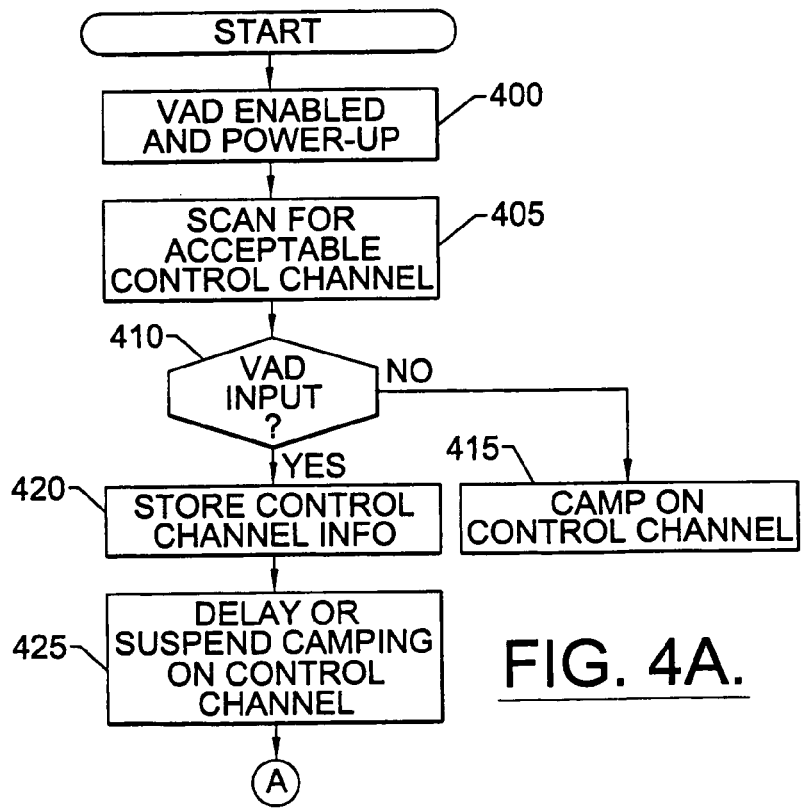
Figure 4B:
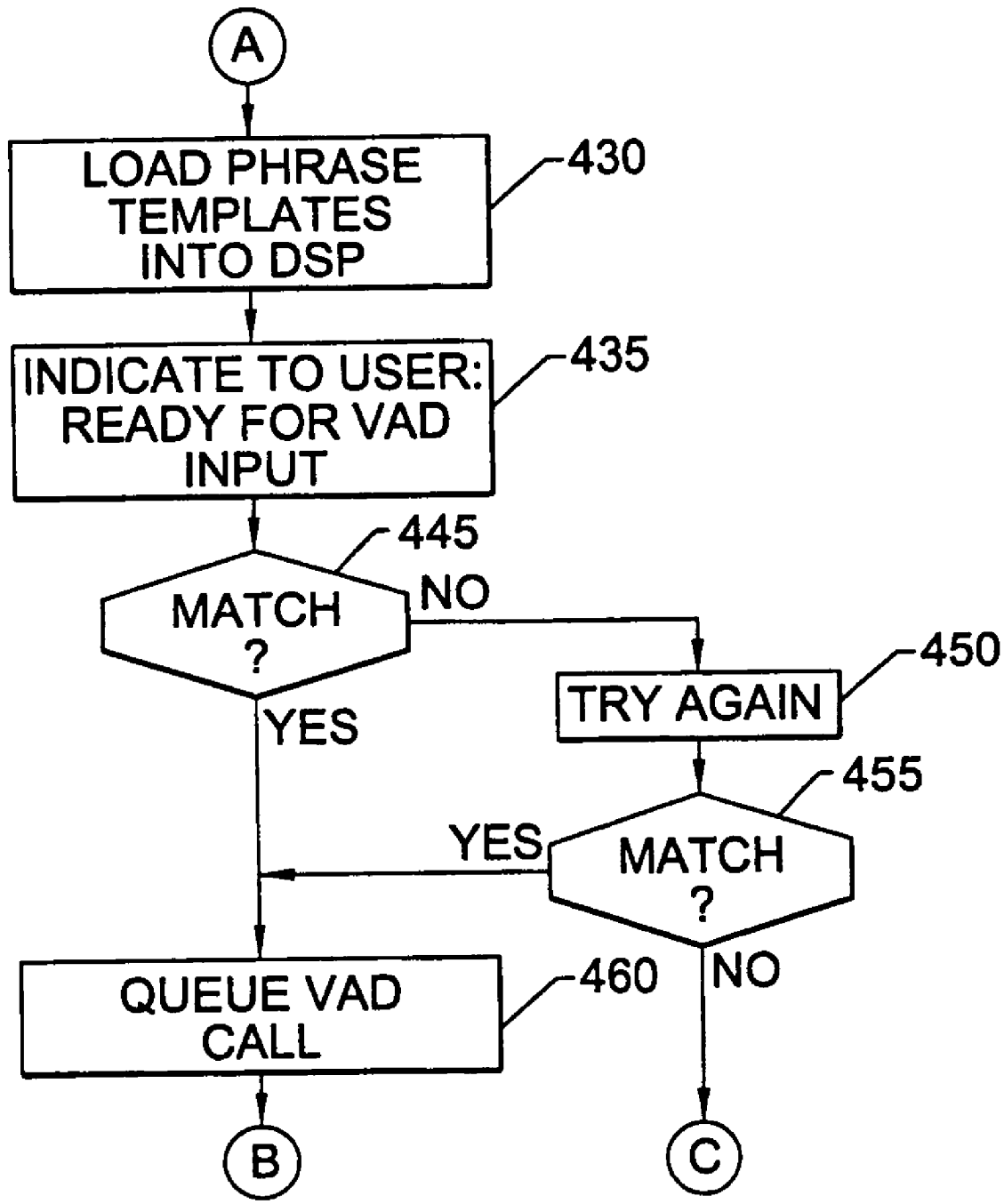
Figure 4C:
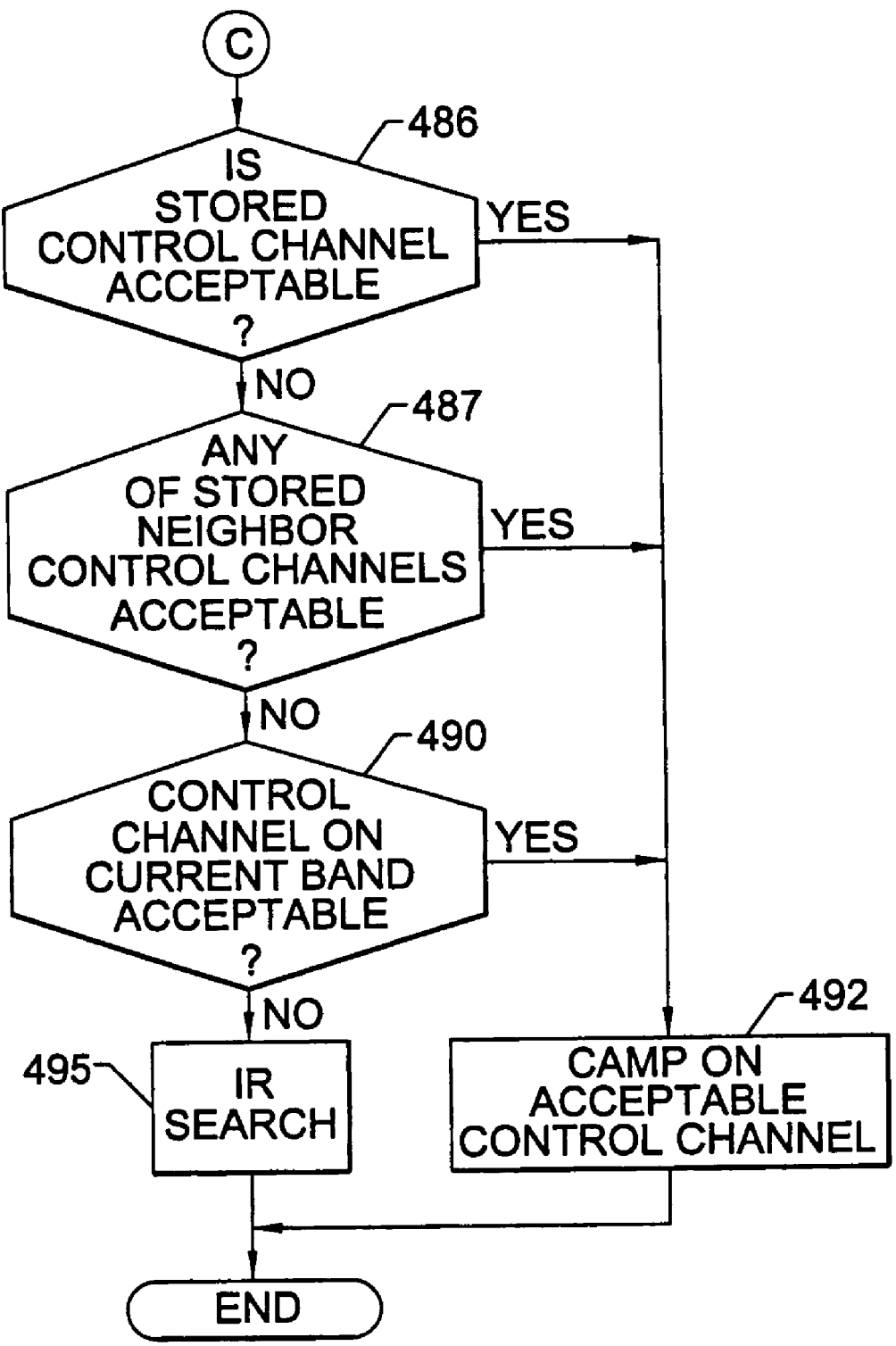
Figure 4D:
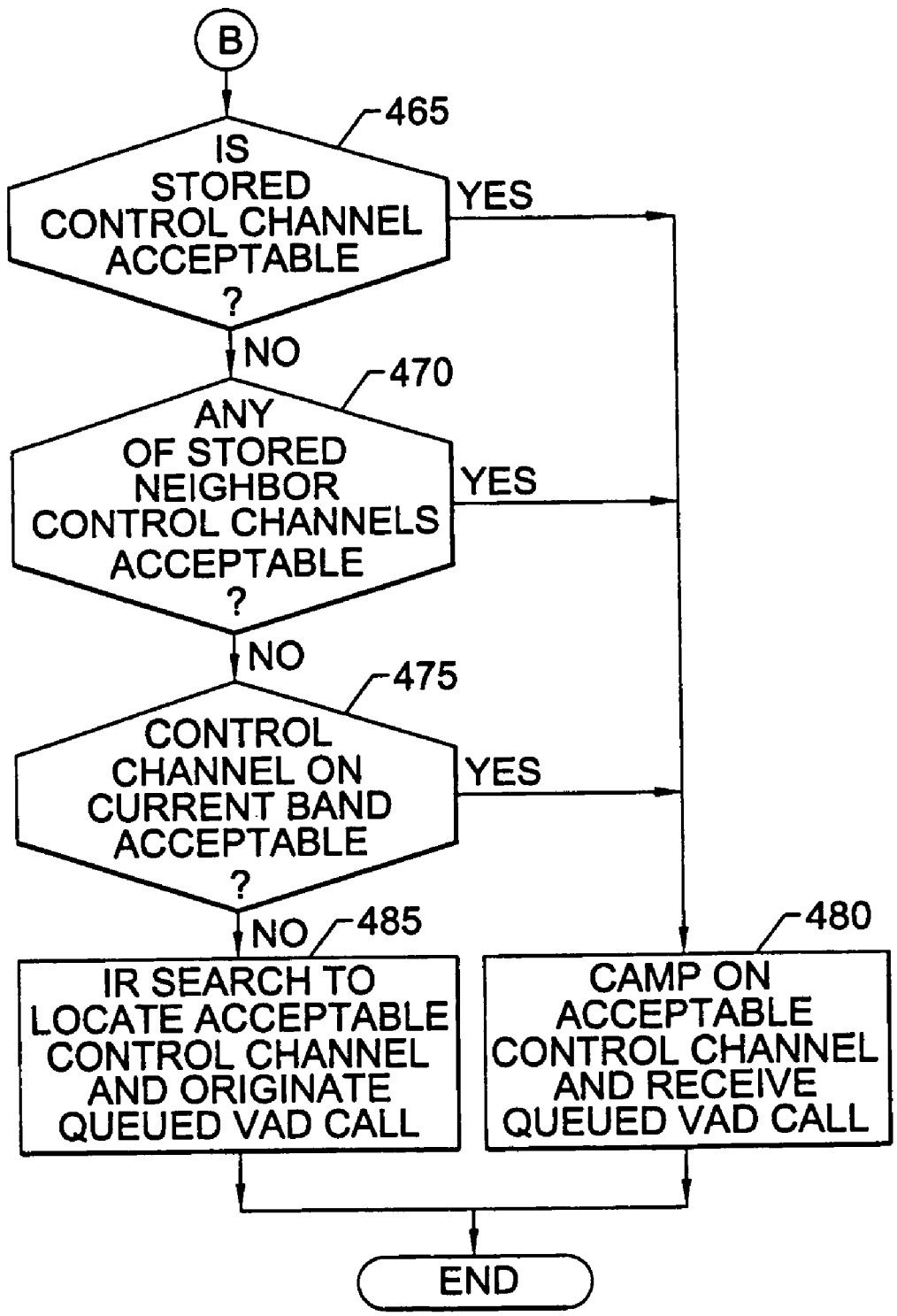

FIG. 3 is a flowchart that illustrates embodiments according to the present invention. As shown in FIG. 3, the wireless terminal is camping on a control channel (block 300) when a request for an operation that is mutually exclusive of the camping operation is received (block 305). The wireless terminal stores control channel information associated with the control channel being camped on (block 310) and performs the requested operation (block 315).

The control channel information stored by the wireless terminal can include the number of the control channel being camped on when the request was received, or other such information that may facilitate re-acquiring the control channel after the requested operation has been performed. The control channel information can also include the numbers of the neighboring control channels received over the control channel being camped on when the request was received. Other information can be included in the control channel information.

In some embodiments, the control channel information is stored in response to receiving the request to perform the mutually exclusive operation. In other embodiments, the control channel information is stored in response to the wireless terminal camping on a control channel.

After performing the requested operation (block 315), the wireless terminal attempts to resume camping using the control channel information stored in the memory (block 320). In some embodiments, the wireless terminal attempts to camp on the control channel identifier by the control channel number stored in memory in block 310. If that control channel is unacceptable (or unavailable), the wireless terminal can attempt to camp on one of the neighboring control channels identified in the control channel information. If none of the control channels identified by the stored control channel information are acceptable, the wireless terminal can attempt to locate an acceptable control channel using an IR search such as those disclosed in Anderson supra.

Some of the operations that may be mutually exclusive of camping operations in some TDMA wireless terminals are performing VAD operations, performing media operations (such as decompressing and playing MP3 objects, decompressing and displaying MPEG objects etc.), scanning for a different type of service such as CDMA, GSM, Enhanced Data rate Global Evolution (EDGE), Cellular Digital Packet Data (CDPD) services (in the case of a multi-mode wireless terminal 40), and the like.

By storing the control channel information before performing the mutually exclusive operation, the wireless terminal can attempt to re-acquire service over the control channel (or a neighboring control channel) on which the wireless terminal was camping prior to receiving the request. Accordingly, the wireless terminal may avoid having to perform a conventional IR scan which may take a considerable amount of time during which the wireless terminal may be unable to receive pages or originate calls.

FIG. 4 is a flowchart that illustrates embodiments of the present invention wherein scanning operations have priority over VAD operations after power-up. As shown in FIG. 4, VAD operation is enabled prior to the wireless terminal receiving a request for power-up (block 400). A request for power-up may be received, for example, when a user turns the wireless terminal on.

After receiving the request for power-up, the wireless terminal initiates scanning operations wherein the wireless terminal scans for an acceptable control channel over which service can be acquired for the wireless terminal (block 405). If the user did not provide input to the microphone during the scanning operations (block 410), the wireless terminal camps on an acceptable control channel located during scanning (block 415).

If the user did provide input to the microphone during the scanning operations (block 410), the wireless terminal stores control channel information associated with the control channel located during scanning in block 405 (block 420) and delays or suspends camping on the located control channel (block 425).

The wireless terminal may then load the voice templates stored in memory into the DSP circuit (block 430). The wireless terminal may, if desired, provide an indication to the user when the voice templates have been loaded into the DSP circuit (block 435). The indication can inform the user that VAD operations are available.

If the input received at block 410 matches one of the loaded voice templates (block 445), the wireless terminal queues the VAD call for later origination (block 460). If the input does not match any of the voice templates (block 445), the wireless terminal can prompt the user to provide the input again (block 450) whereupon the wireless terminal determines if the second input matches any of the loaded voice templates (block 455). If the second input matches any of the loaded voice templates (block 455), the wireless terminal queues the VAD call for later origination (block 460).

If the second input does not match any of the loaded voice templates (block 455), the wireless terminal determines if the control channel identified by the control channel number stored in the memory is acceptable (block 486) using, for example, the received signal strength of a signal received over the control channel as an indication that the control channel is acceptable. If that control channel is not acceptable (block 486), the wireless terminal determines if any of the neighbor control channels identified by the neighbor control channel numbers are acceptable (block 487). If none of the neighbor control channels are acceptable (block 487), the wireless terminal determines if any of the control channels on the current frequency band are acceptable (block 490). If any of the control channels described above in reference to blocks 486, 487, 490 are determined to be acceptable, the wireless terminal camps on the acceptable control channel.

If none of the control channels described above in reference to blocks 486, 487, 490 are acceptable, the wireless terminal can scan for an acceptable control channel using an IR search such as those disclosed in Anderson supra.

Referring back to block 460, the wireless terminal queues the VAD call upon determining a match with one of the loaded voice templates and determines if the control channel identified by the control channel number stored in block 420 is acceptable (block 465). If the control channel is not acceptable (block 465), the wireless terminal determines if any of the neighbor control channels identified by the neighbor control channel numbers stored in block 420 are acceptable (block 470). If none of the neighbor control channels are acceptable (block 470), the wireless terminal determines if any control channel on the current band is acceptable (block 475). If any of the control channels described above in reference to blocks 465, 470, 475 are determined to be acceptable, the wireless terminal camps on the acceptable control channel.

If none of the control channels described above in reference to blocks 465, 470, 475 are determined to be acceptable, the wireless terminal can scan for an acceptable control channel using a conventional IR search.

Figure 5:
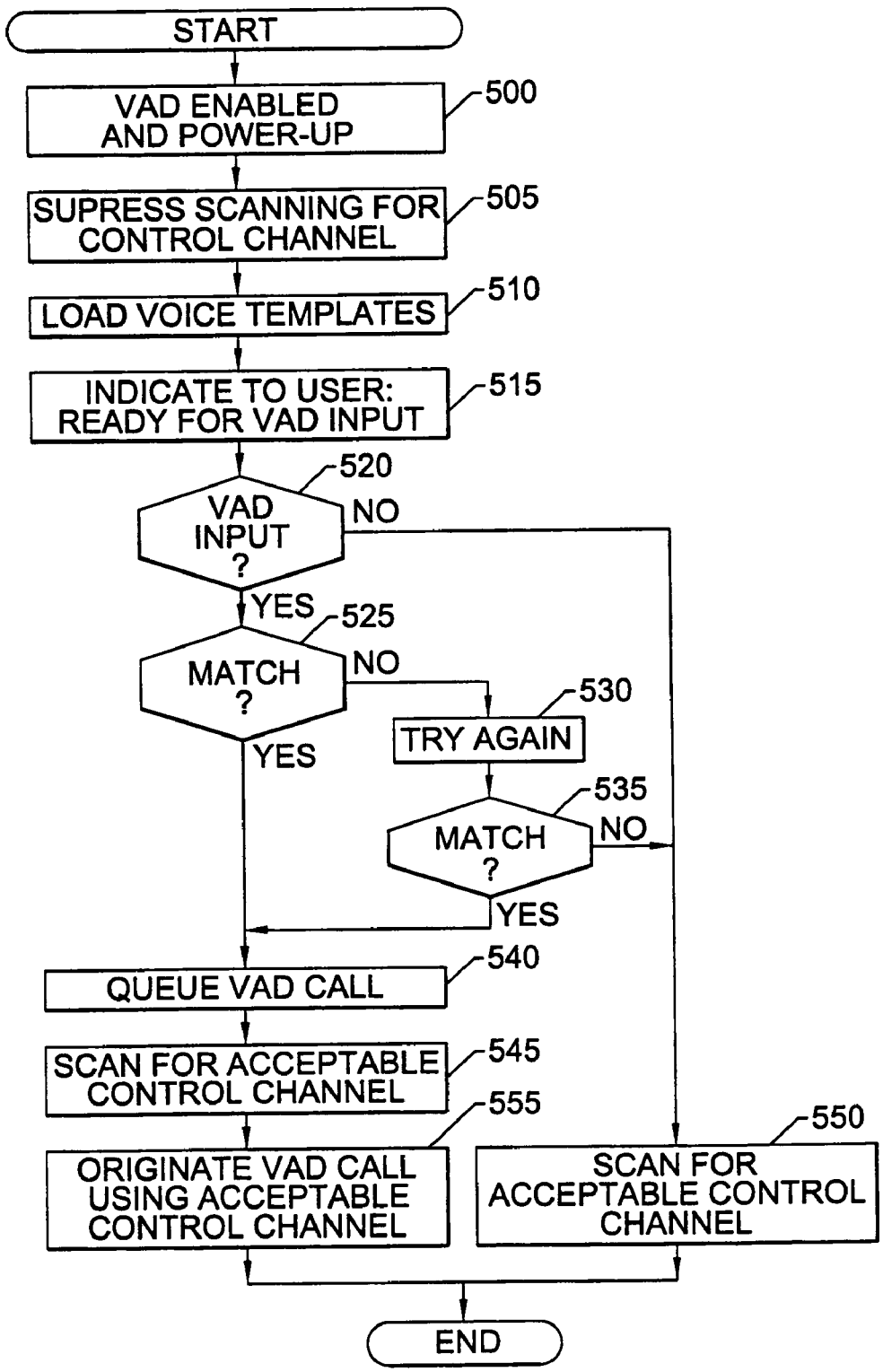

FIG. 5 is a flowchart that illustrates embodiments according to the present invention wherein VAD operations have priority over scanning operations. As shown in FIG. 5, VAD operation is enabled prior to the wireless terminal receiving a request for power-up (block 500). A request for power-up may be received, for example, when a user turns the wireless terminal on.

After receiving the request for power-up, the wireless terminal suppresses scanning for an acceptable control channel over which service can be acquired for the wireless terminal (block 505) and loads the voice templates into the DSP circuit from the memory (block 510). The wireless terminal may provide an indication to the user when the voice templates have been loaded into the DSP circuit (block 515). The indication can inform the user that VAD operations are available.

If the user does not provide a VAD input within a predetermined time (block 520), the wireless terminal can initiate scanning operations wherein the wireless terminal scans for an acceptable control channel over which service can be acquired for the wireless terminal (block 550). If the user speaks during scanning, VAD operation may be queued until an acceptable control channel is found. If the user speaks into the microphone within the predetermined time (block 520), the wireless terminal determines if the input matches one of the loaded voice templates (block 525).

If the input matches one of the loaded voice templates (block 525), the wireless terminal queues a VAD call to the associate telephone number for later origination (block 540). If the input does not match any of the loaded voice templates (block 525), the wireless terminal can prompt the user to provide the input again (block 530) whereupon the wireless terminal determines if the second input matches any of the loaded voice templates (block 535). If the second input matches any of the loaded voice templates (block 535), the wireless terminal may queue the VAD call to the associated telephone number for later origination (block 540). If the second input does not match any of the loaded voice templates (block 535), the wireless terminal can initiate scanning operations, wherein the wireless terminal scans for an acceptable control channel over which service can be acquired for the wireless terminal (block 550).

After queuing the VAD call for later origination (block 540), the wireless terminal initiates scanning operations wherein the wireless terminal scans for an acceptable control channel over which service can be acquired for the wireless terminal (block 545). After acquiring service, the wireless terminal originates the queued VAD call (block 555).

Figure 6:
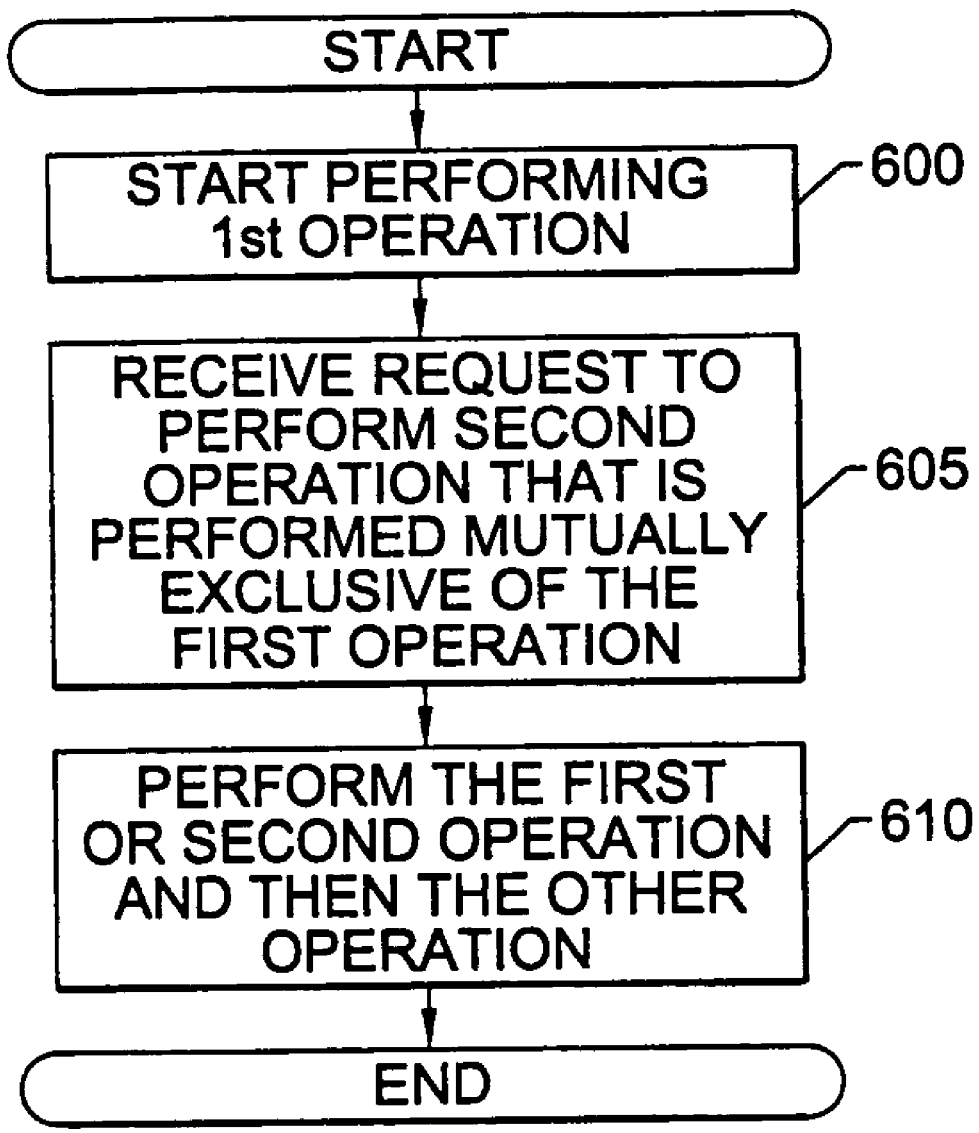

FIG. 6 is a flowchart that illustrates embodiments of the present invention wherein mutually exclusive operations performed by the TDMA wireless terminal are performed separately by the DSP circuit. As shown in FIG. 6, if while performing a first operation, such as scanning or camping (block 600), the wireless terminal receives a request to perform a second operation that is mutually exclusive of the first operation (block 605), the wireless terminal performs one of the first and second operations and then the other operation (block 610). It will be understood that the first operation can be received before the second operation. Alternatively, the second operation can be received before the first operation. Accordingly, the wireless terminal can avoid attempting to perform two operations that are mutually exclusive of one another.

Embodiments according to the present invention can provide methods for acquiring service for a TDMA wireless terminal and associated wireless terminals. Pursuant to these embodiments, a wireless terminal that is camping on a TDMA digital control channel may receive a request to perform an operation that the wireless terminal performs mutually exclusive of camping on the TDMA digital control channel. After reviewing such a request, TDMA digital control channel information associated with the TDMA digital control channel may be stored and the requested operation may be performed. The stored TDMA digital control channel information may then be used to re-acquire service for the wireless terminal.

Using the stored TDMA DCCH information to acquire service for the wireless terminal may reduce the time that otherwise may be required to locate an acceptable TDMA digital control channel. In particular, the wireless terminal can first attempt to acquire service over the TDMA DCCH on which the wireless terminal was camped before the request to perform the operation was received. Accordingly, a lengthy conventional IR search may be avoided which may reduce the time that the wireless terminal is unable to receive pages and/or originate calls.

In some embodiments of the invention, the TDMA digital control channel information includes a TDMA digital control channel number that identifies the TDMA digital control channel on which the wireless terminal was camped prior to receiving the request for the operation. In other embodiments, the TDMA digital control channel information may include at least one neighbor TDMA digital control channel number that identifies at least one neighbor TDMA digital control channel associated with at least one area that neighbors an area associated with the TDMA digital control channel on which the wireless terminal was camped prior to receiving the request for the operation.

In some embodiments the TDMA digital control channel information is stored in response to receiving the request for the operation to be performed. In other embodiments the TDMA digital control channel information is stored responsive to camping on the TDMA digital control channel.

In still other embodiments the operation to be performed comprise at least one of a voice activated dialing operation and a media operation. In other embodiments the media operation comprises at least one of playing an MP3 object and displaying an MPEG object.

In some embodiments of the invention, the operation to be performed comprises a radio frequency shutdown operation that disables radio frequency portions of the wireless terminal. In other embodiments the operation to be performed comprises scanning for a second service that is different than a first service associated with the TDMA digital control channel. In further embodiments the operation to be performed comprises scanning for service associated with the TDMA digital control channel responsive to losing synchronization with the TDMA digital control channel.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for acquiring service for a TDMA wireless terminal, the method comprising:
 camping on a TDMA digital control channel;
 receiving a request for an operation to be performed by the TDMA wireless terminal that is performed by the TDMA wireless terminal mutually exclusive of camping on the TDMA digital control channel;
 storing TDMA digital control channel information associated with the TDMA digital control channel;
 suspending camping on the TDMA digital control channel;
 performing the requested operation; and
 using the stored TDMA digital control channel information to acquire service for the wireless terminal.

2. A method according to claim 1, wherein the TDMA digital control channel information comprises a TDMA digital control channel number that identifies the TDMA digital control channel on which the wireless terminal was camped prior to receiving the request for the operation.

3. A method according to claim 2, wherein the TDMA digital control channel information further comprises at least one neighbor TDMA digital control channel number that identifies at least one neighbor TDMA digital control channel associated with at least one area that neighbors an area associated with the TDMA digital control channel on which the wireless terminal was camped prior to receiving the request for the operation.

4. A method according to claim 1, wherein storing the TDMA digital control channel information is done in response to receiving the request for the operation to be performed.

5. A method according to claim 1, wherein the TDMA digital control channel information is stored prior to receiving the request for the operation.

6. A method for acquiring service for a TDMA wireless terminal, the method comprising:
camping on a TDMA digital control channel;
receiving a request for an operation to be performed by the TDMA wireless terminal that is performed by the TDMA wireless terminal mutually exclusive of camping on the TDMA digital control channel;
storing TDMA digital control channel information associated with the TDMA digital control channel;
suspending camping on the TDMA digital control channel;
performing the requested operation; and
using the stored TDMA digital control channel information to acquire service for the wireless terminal, wherein the operation to be performed comprises a voice activated dialing operation or a media playback operation.

7. A method according to claim 6, wherein the media playback operation comprises playing an MP3 object or displaying an MPEG object.

8. A method according to claim 1, wherein the operation to be performed comprises a radio frequency shutdown operation that disables radio frequency portions of the wireless terminal.

9. A method according to claim 1, wherein the operation to be performed comprises scanning for a second service that is different than a first service associated with the TDMA digital control channel.

10. A method according to claim 1, wherein the operation to be performed comprises scanning for service associated with the TDMA digital control channel responsive to losing synchronization with the TDMA digital control channel.

11. A method for a TDMA wireless terminal to perform mutually exclusive operations, the method comprising:
receiving a request for a first operation to be performed by the TDMA wireless terminal using a TDMA digital control channel;
receiving a request for a second operation to be performed by the TDMA wireless terminal that is performed by the TDMA wireless terminal mutually exclusive of the first operation;
suspending use of the TDMA digital control channel by the TDMA wireless terminal; and
performing one of the first and second operations in the TDMA wireless terminal and then performing the other of the first and second operations.

12. A method according to claim 11, wherein the first operation to be performed comprises scanning for the TDMA digital control channel.

13. A method according to claim 11, wherein the first operation to be performed comprises camping on the TDMA digital control channel.

14. A method for a TDMA wireless terminal to perform mutually exclusive operations, the method comprising:
receiving a request for a first operation to be performed by the TDMA wireless terminal using a TDMA digital control channel;
receiving a request for a second operation to be performed by the TDMA wireless terminal that is performed by the TDMA wireless terminal mutually exclusive of the first operation;
suspending camping on the TDMA digital control channel; and
performing one of the first and second operations in the TDMA wireless terminal and then performing the other of the first and second operations, wherein the first operation comprises performing a voice-activated dialing operation.

15. A method according to claim 13, wherein the method further comprises storing TDMA digital control channel information associated with the TDMA digital control channel in response to receiving the request for the second operation.

16. A method according to claim 15, wherein the TDMA control channel information comprises a TDMA digital control channel number that identifies the TDMA digital control channel associated with the first operation.

17. A method according to claim 16, wherein the TDMA control channel information further comprises at least one neighboring TDMA digital control channel number that identifies at least a second TDMA digital control channel associated with at least one neighboring area that neighbors an area associated with the TDMA digital control channel associated with the first operation.

18. A method according to claim 11, wherein the second operation to be performed comprises performing a media operation.

19. A method according to claim 18, wherein the media operation comprises playing an MP3 object or displaying an MPEG object.

20. A method for a TDMA wireless terminal to perform mutually exclusive operations, the method comprising:
receiving a request for a first operation to be performed by the TDMA wireless terminal using a TDMA digital control channel;
receiving a request for a second operation to be performed by the TDMA wireless terminal that is performed by the TDMA wireless terminal mutually exclusive of the first operation;
suspending camping on the TDMA digital control channel;
performing one of the first and second operations in the TDMA wireless terminal and then performing the other of the first and second operations, wherein the second operation to be performed comprises a radio frequency shutdown operation that disables radio frequency portions of the wireless terminal.

21. A TDMA wireless terminal comprising:
a housing;
a transceiver circuit positioned in the housing;
an antenna extending from the housing and coupled to the transceiver circuit;
a controller circuit, positioned in the housing and coupled to the transceiver, that performs camping on a TDMA digital control channel and operations that are performed by the TDMA wireless terminal mutually exclusive of camping on the TDMA digital control channel, wherein the controller circuit stores TDMA digital control channel information associated with the TDMA digital control channel prior to performing operations that are mutually exclusive of camping, suspends camping on the TDMA digital control channel during performance of operation that is mutually exclusive of camping, and uses the stored TDMA digital control channel information to acquire service for the wireless terminal after completing the operations that are performed mutually exclusive of camping; and
a memory operatively coupled to the controller circuit that stores the TDMA digital control channel information.

22. A wireless terminal according to claim 21, wherein the TDMA digital control channel information comprises a TDMA digital control channel number that identifies the TDMA digital control channel on which the wireless terminal was camping before receiving a request to perform an operation.

23. A wireless terminal to claim 22, wherein the TDMA digital control channel information further comprises at least one neighbor TDMA digital control channel number that identifies at least a neighbor TDMA digital control channel associated with at least one area that neighbors an area associated with the TDMA digital control channel on which the wireless terminal was camping before receiving the request to perform the operation.

24. A wireless terminal according to claim 21, wherein the controller circuit stores the TDMA digital control channel information responsive to receiving a request for the operation to be performed.

25. A wireless terminal according to claim 21, wherein the controller circuit stores the TDMA digital control channel information responsive to camping on the TDMA digital control channel.

26. A TDMA wireless terminal comprising:
a housing;
a transceiver circuit positioned in the housing;
an antenna extending from the housing and coupled to the transceiver circuit;
a controller circuit, positioned in the housing and coupled to the transceiver, that performs camping on a TDMA digital control channel and operations that are performed by the TDMA wireless terminal mutually exclusive of camping on the TDMA digital control channels wherein the controller circuit stores TDMA digital control channel information associated with the TDMA digital control channel prior to performing operations that are mutually exclusive of camping, suspends camping on the TDMA digital control channel during performance of operation that is mutually exclusive of camping, and uses the stored TDMA digital control channel information to acquire service for the wireless terminal after completing the operations that are performed mutually exclusive of camping; and
a memory operatively coupled to the controller circuit that stores the TDMA digital control channel information, wherein an operation to be performed comprises a voice activated dialing operation or a media playback operation.

27. A TDMA wireless terminal comprising:
a housing;
a transceiver circuit positioned in the housing;
an antenna extending from the housing and coupled to the transceiver circuit;
a controller circuit, positioned in the housing and coupled to the transceiver, that performs camping on a TDMA digital control channel and operations that are performed by the TDMA wireless terminal mutually exclusive of camping on the TDMA digital control channel, wherein the controller circuit stores TDMA digital control channel information associated with the TDMA digital control channel prior to performing operations that are mutually exclusive of camping, suspends camping on the TDMA digital control channel during performance of operation that is mutually exclusive of camping, and uses the stored TDMA digital control channel information to acquire service for the wireless terminal after completing the operations that are performed mutually exclusive of camping; and
a memory operatively coupled to the controller circuit that stores the TDMA digital control channel information, wherein an operation to be performed comprises a transceiver shutdown operation that disables the transceiver circuit.

28. A wireless terminal according to claim 21, wherein an operation to be performed comprises scanning for a second service that is different than a first service associated with the TDMA digital control channel.

29. A wireless terminal according to claim 21, wherein an operation to be performed comprises scanning for service associated with the TDMA digital control channel responsive to losing synchronization with the TDMA digital control channel.

30. A wireless terminal comprising:
means for camping on a TDMA digital control channel;
means for receiving a request for an operation to be performed by the TDMA wireless terminal that is performed by the TDMA wireless terminal mutually exclusive of camping on the TDMA digital control channel;
means for storing TDMA digital control channel information associated with the TDMA digital control channel;
means for suspending camping on the TDMA digital control channel;
means for performing the requested operation; and
means for using the stored TDMA digital control channel information to acquire service for the wireless terminal.

31. A wireless terminal according to claim 30, wherein the TDMA digital control channel information comprises a TDMA digital control channel number that identifies the TDMA digital control channel on which the wireless terminal was camping before receiving the request to perform the operation.

32. A wireless terminal according to claim 31, wherein the TDMA digital control channel information further comprises at least one neighbor TDMA digital control channel number that identifies at least one neighbor TDMA digital control channel associated with at least one area that neighbors an area associated with the TDMA digital control channel on which the wireless terminal was camping before receiving the request to perform the operation.

33. A wireless terminal according to claim 30, wherein means for storing the TDMA digital control channel information is done in response to receiving the request for the operation to be performed.

34. A wireless terminal according to claim 30, wherein the TDMA digital control channel information is stored prior to receiving the means for request for the operation.

35. A wireless terminal comprising:
means for camping on a TDMA digital control channel;
means for receiving a request for an operation to be performed by the TDMA wireless terminal that is performed by the TDMA wireless terminal mutually exclusive of camping on the TDMA digital control channel;
means for storing TDMA digital control channel information associated with the TDMA digital control channel;

means for suspending camping on the TDMA digital control channel;
means for performing the requested operation; and
means for using the stored TDMA digital control channel information to acquire service for the wireless terminal, wherein the operation to be performed comprises a voice activated dialing operation or a media playback operation.

* * * * *

UNITED STATES PATENT AND TRADEMARK OFFICE
CERTIFICATE OF CORRECTION

PATENT NO.       : 6,992,997 B1                                           Page 1 of 1
APPLICATION NO.  : 09/690201
DATED            : January 31, 2006
INVENTOR(S)      : Wail Refai, David Hoover and Keith W. Anderson It is certified that error appears in the above-identified patent and that said Letters Patent is hereby corrected as shown below:

Column 15, line 33, "channels wherein" should be changed to --channel, wherein--.

Signed and Sealed this

Nineteenth Day of December, 2006

JON W. DUDAS
*Director of the United States Patent and Trademark Office*